(12) United States Patent
Tsai

(10) Patent No.: US 12,539,936 B2
(45) Date of Patent: Feb. 3, 2026

(54) LOCKING DEVICE FOR CONNECTING SUSPENSION DEVICE TO FRONT FORK

(71) Applicant: Ming-Ta Tsai, New Taipei (TW)

(72) Inventor: Ming-Ta Tsai, New Taipei (TW)

(73) Assignee: DAH KEN INDUSTRIAL CO., LTD.

( * ) Notice: Subject to any disclaimer, the term of this patent is extended or adjusted under 35 U.S.C. 154(b) by 536 days.

(21) Appl. No.: 18/092,443

(22) Filed: Jan. 3, 2023

(65) Prior Publication Data

US 2024/0217612 A1    Jul. 4, 2024

(51) Int. Cl.
*B62K 21/20* (2006.01)
(52) U.S. Cl.
CPC .................... *B62K 21/20* (2013.01)
(58) Field of Classification Search
CPC ......... B62K 21/18; B62K 21/20; B62K 25/08
USPC ........................................ 280/276, 277, 280
See application file for complete search history.

(56) References Cited

U.S. PATENT DOCUMENTS

2021/0316811 A1*  10/2021  Borgese ................. B62K 21/20

* cited by examiner

*Primary Examiner* — Valentin Neacsu
*Assistant Examiner* — Felicia L. Brittman-Alabi

(57) ABSTRACT

A locking device for connecting a suspension device to a front fork of a bike, and includes an adapter which is connected between the suspension device and the front fork. A first part and a second part respectively extend from the top face and the bottom face of the adapter. The second part is inserted in the front fork. Multiple bores are defined through the adapter, and are located around the first part and the second part. An axial hole is defined through the first part and the second part, the steerer tube extends through the axial hole. Multiple bolts extend through the bores and are threadedly connected to threaded holes defined in the crown of the front fork. The suspension device and the front fork can be individually replaced and maintained.

8 Claims, 11 Drawing Sheets

LOCKING DEVICE FOR CONNECTING SUSPENSION DEVICE TO FRONT FORK

BACKGROUND OF THE INVENTION

1. Fields of the Invention

The present invention relates to a locking device, and more particularly, to a locking device for connecting a suspension device to a bike front fork.

2. Descriptions of Related Art

The conventional combination of bike front fork 4 and suspension device 3 is disclosed in FIG. 11, and includes a steerer tube 41 extending upward from the crown of the front fork 4, and the suspension device 3 is mounted to outside of the steerer tube 41. When assembling, a tube 5 is connected to the steerer tube 41. It is noted that the parts between the suspension device 3 and the front fork 4 are all tight-fitted, and the parts between the tube 5 and the suspension device 3 is tight-fitted as well. The spring of the suspension device 3 is then compressed and mounted to the steerer tube 41 of the front fork 4. When one of the parts of the front fork 4 and the suspension device 3 is required to be replaced, a special tool is needed to un-assemble the whole combination. Some parts might be damaged during the un-assembling processes, and this may cause malfunction to the suspension device 3 and the front fork 4.

In addition, when replacing the existed suspension device 3 and the front fork 4 from a bike, the whole set of the suspension device 3 and the front fork 4 have to be removed from the bike, and this is a time-consuming task.

The present invention intends to provide a locking device for connecting a suspension device to a front fork of a bike so as to eliminate the shortcomings mentioned above.

SUMMARY OF THE INVENTION

The present invention relates to a locking device for connecting a suspension device to a front fork of a bike, and comprises an adapter that includes a top face and a bottom face. The top face of the adapter contacts the suspension device. A first part and second part respectively extend axially the top face and the bottom face of the adapter. The bottom face of the adapter is connected to the front fork. Multiple bores are defined through the top face and the bottom face of the adapter. The bores are located around the first part and the second part. An axial hole is defined through the first part and the second part. Multiple bolts extend through the bores and are threadedly connected to threaded holes defined in the crown of the front fork.

The primary object of the present invention is to provide an adapter that is connected to the front fork and located between the front fork and the suspension device. The suspension device and the front fork can be individually replaced and maintained.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 10:
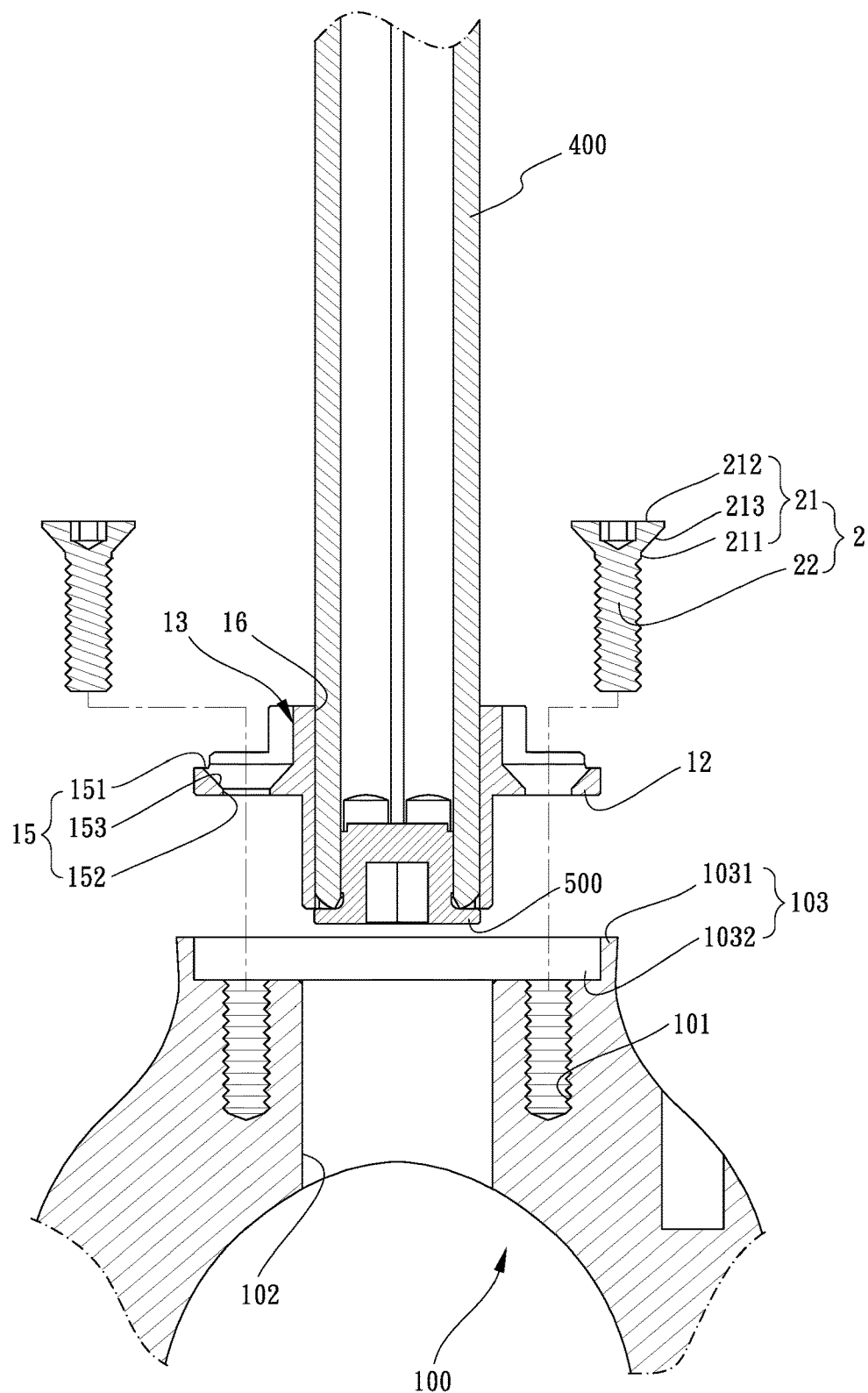
FIG. 10 shows that all of the bolts are removed from the adapter, and the steerer tube is removed from the front fork.
Figure 11:
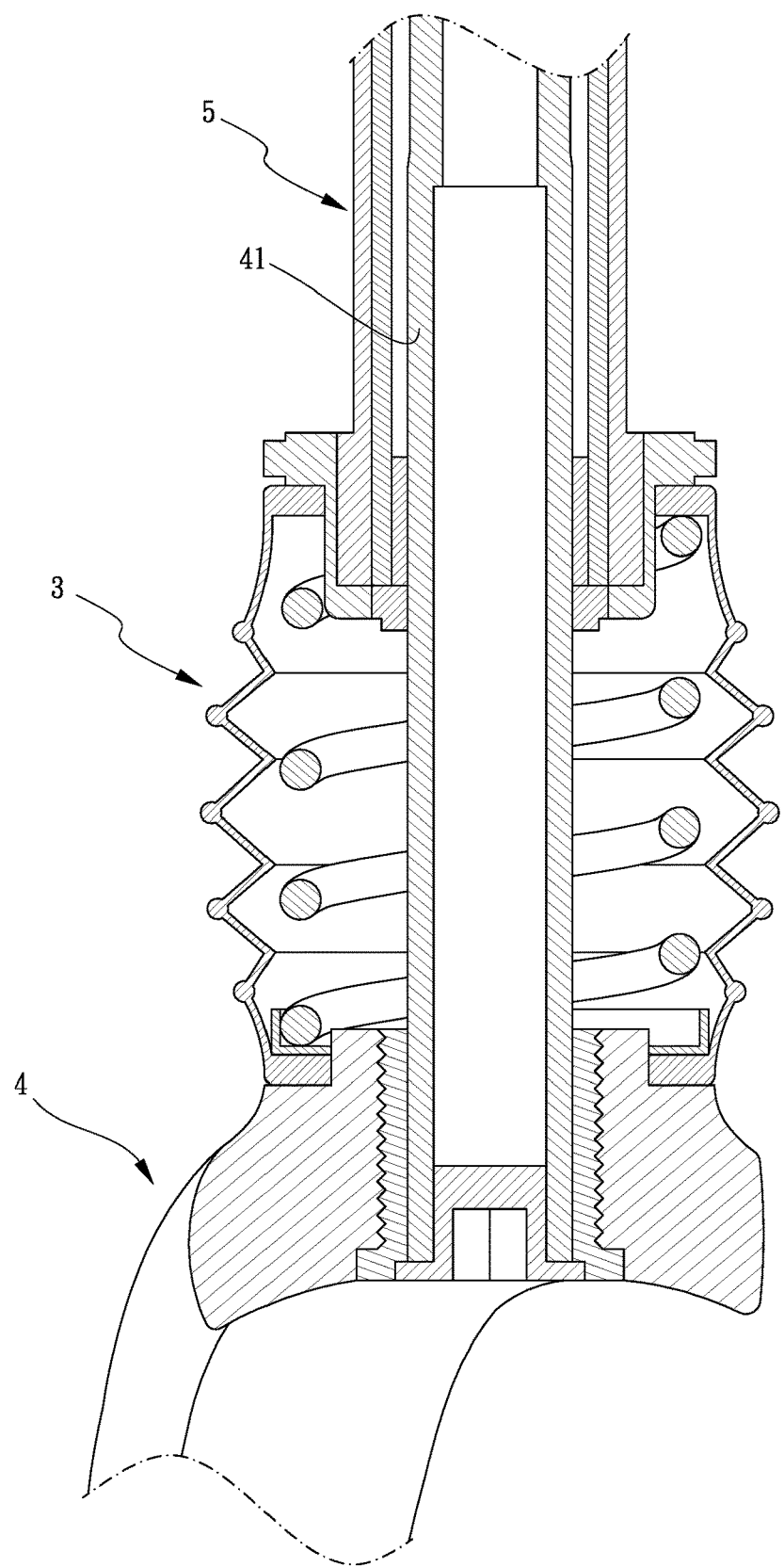
FIG. 11 shows a conventional front fork with a suspension device.

Referring to FIGS. 1 to 10, the locking device of the present invention comprises an adapter 1 which includes a top face 11 and a bottom face 12. The top face 11 of the adapter 1 contacts the suspension device 200, and the bottom face 12 of the adapter 1 is connected to the front fork 100 of a bike 300 as shown in FIG. 10. A first part 13 extends axially and upward from the top face 11 of the adapter 1, and a second part 14 extends axially and downward from the bottom face 12 of the adapter 1. The first part 13 is a gear-like part and the second part 14 is a tubular part. Multiple bores 15 are defined through the top face 11 and the bottom face 12 of the adapter 1. The bores 15 are located around the first part 13 and the second part 14. An axial hole 16 is defined through the first part 13 and the second part 14. Multiple bolts 2 extend through the bores 15 and are threadedly connected to threaded holes 101 defined in the crown of the front fork 100.

As shown in FIGS. 7 to 10, when the suspension device 200 and the front fork 100 are installed to the bike 300, if the users wants to replace the front fork 100, the first way is to pull the suspension device 200 upward, and then use a tool to remove the bolts 2. After all of the bolts 2 are removed, the parts of the front fork 100 can be separated from the suspension device 200. The second way is remove the suspension device 200 from the front fork 100 so as to access the adapter 1 and the bolts 2. The bolts 2 are then removed by using a tool, and the parts in the front fork 100 can be replaced. By the use of the adapter 1 of the present invention, the replacement of the parts of the front fork 100 can be easily finished while the suspension device 200 and other important parts are remained the same. This is also benefit for the manufacturers of suspension devices 200, because the suspension devices 200 can be sold individually.

Figure 3:
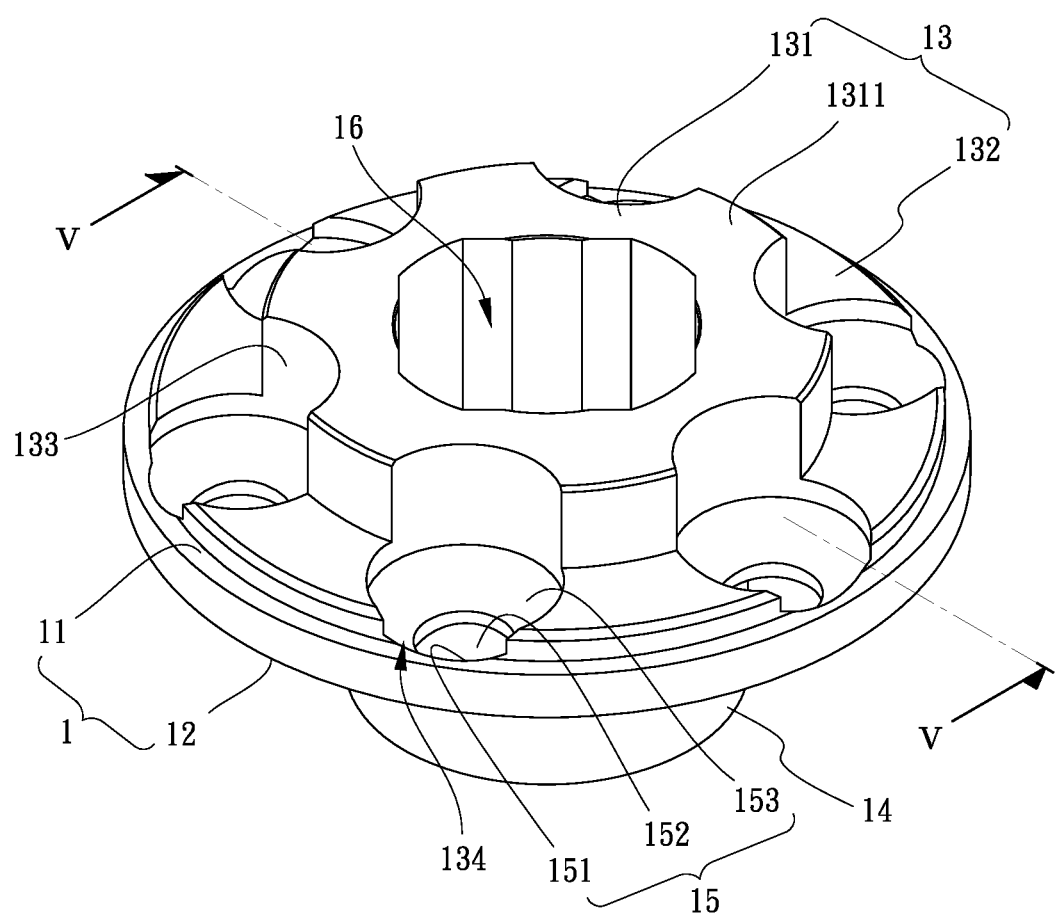
FIG. 3 is a perspective view to show the adapter of the locking device of the present invention.
Figure 4:
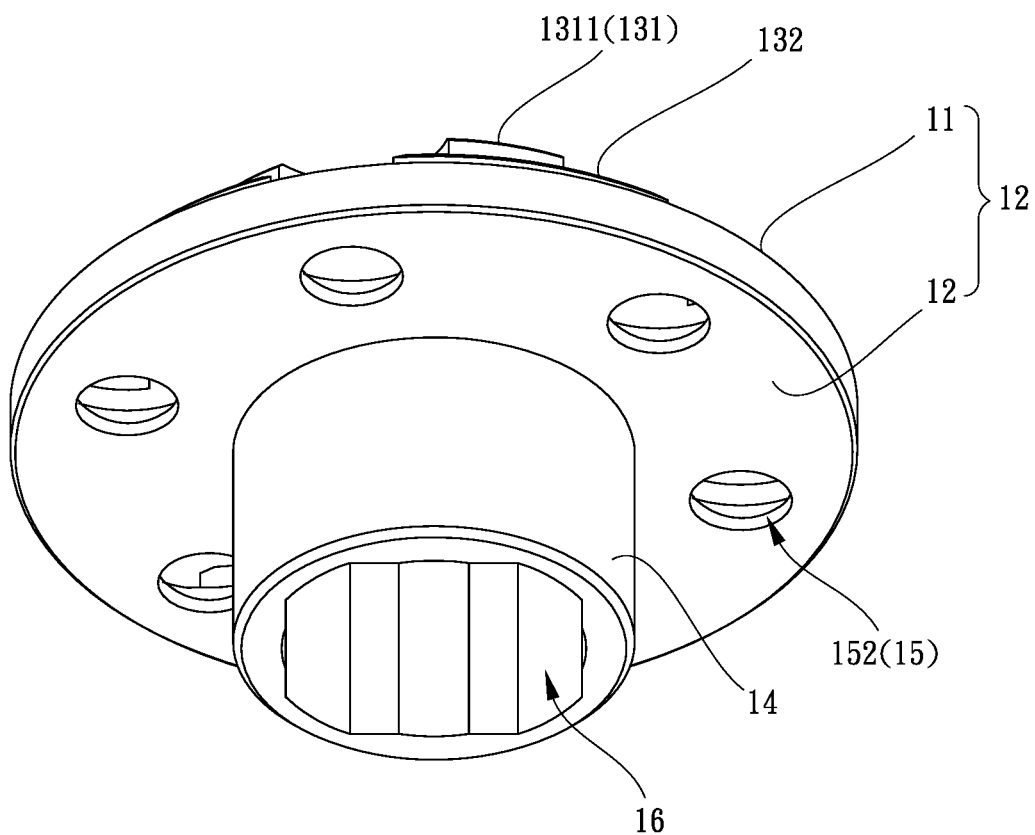
FIG. 4 is another perspective view to show the adapter of the locking device of the present invention.
Figure 5:
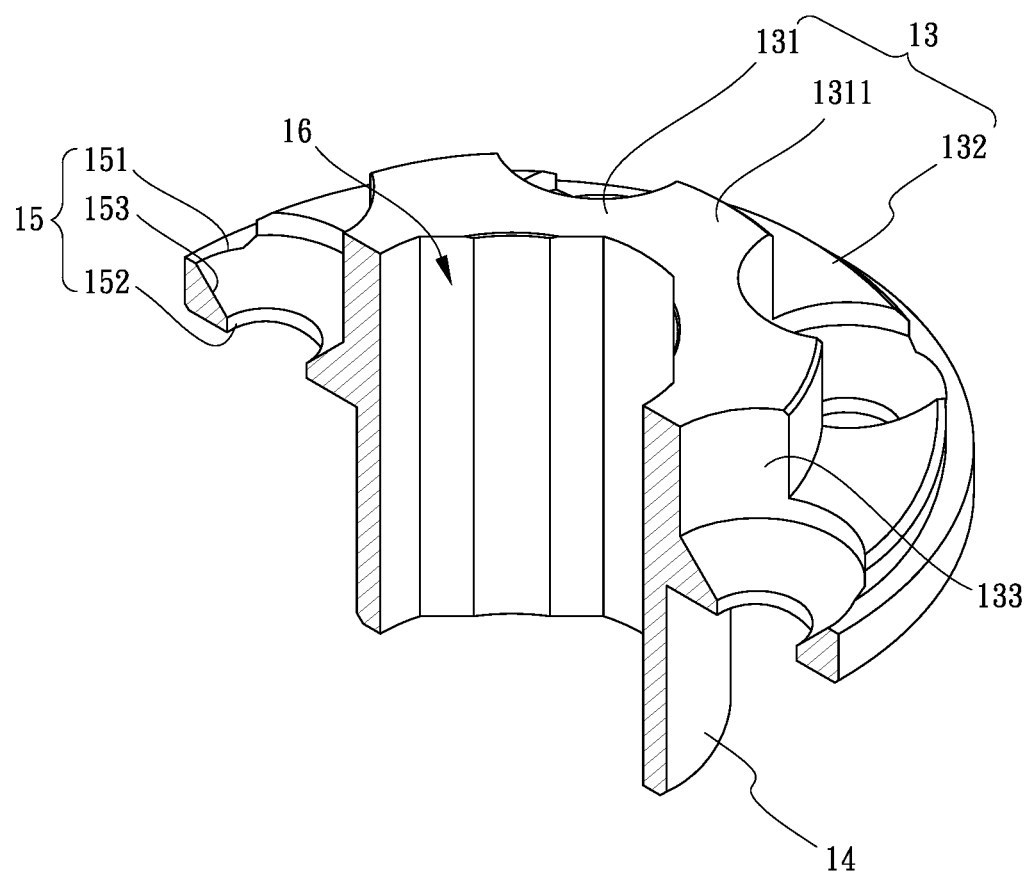
FIG. 5 is a cross sectional view, taken along line V-V of FIG. 3.

As shown in FIGS. 3 to 5, in order to secure the connection between the front fork 100 and the first part 13 of the adapter 1, the first part 13 includes a protrusion 131 which includes multiple radial portions 1311 protruding radially from the outer periphery of the protrusion 131. An extension 132 extends radially from the lower portion of each radial portion 1311. The bores 15 are alternatively located between the extensions 132. The protrusion 131 and the extensions 132 ensure that the bolts 2 are securely connected to the front fork 100, and the bolts 2 are also protected by the protrusion 131 and the extensions 132. This is because the protrusion 131 and the extensions 132 are located higher than the bolts 15 to protect the bolts 15 from being hit by other parts.

The first part 13 includes multiple curved recesses 133 formed through the top of thereof. Each of the curved recesses 133 is located corresponding to and in communication with one of the bores 15. A cut-out 134 is formed along the periphery of each bore 15 and located between two extensions 132. Each cut-out 134 is located opposite to the curved recess 133 corresponding thereto. The users can use a tool to easily access the bolts 2 via the curved recesses 133. The cut-outs 134 allow the user to insert the user's finger to access the bores 15 to pick the bolts 2 out from the bores 15.

Figure 6:
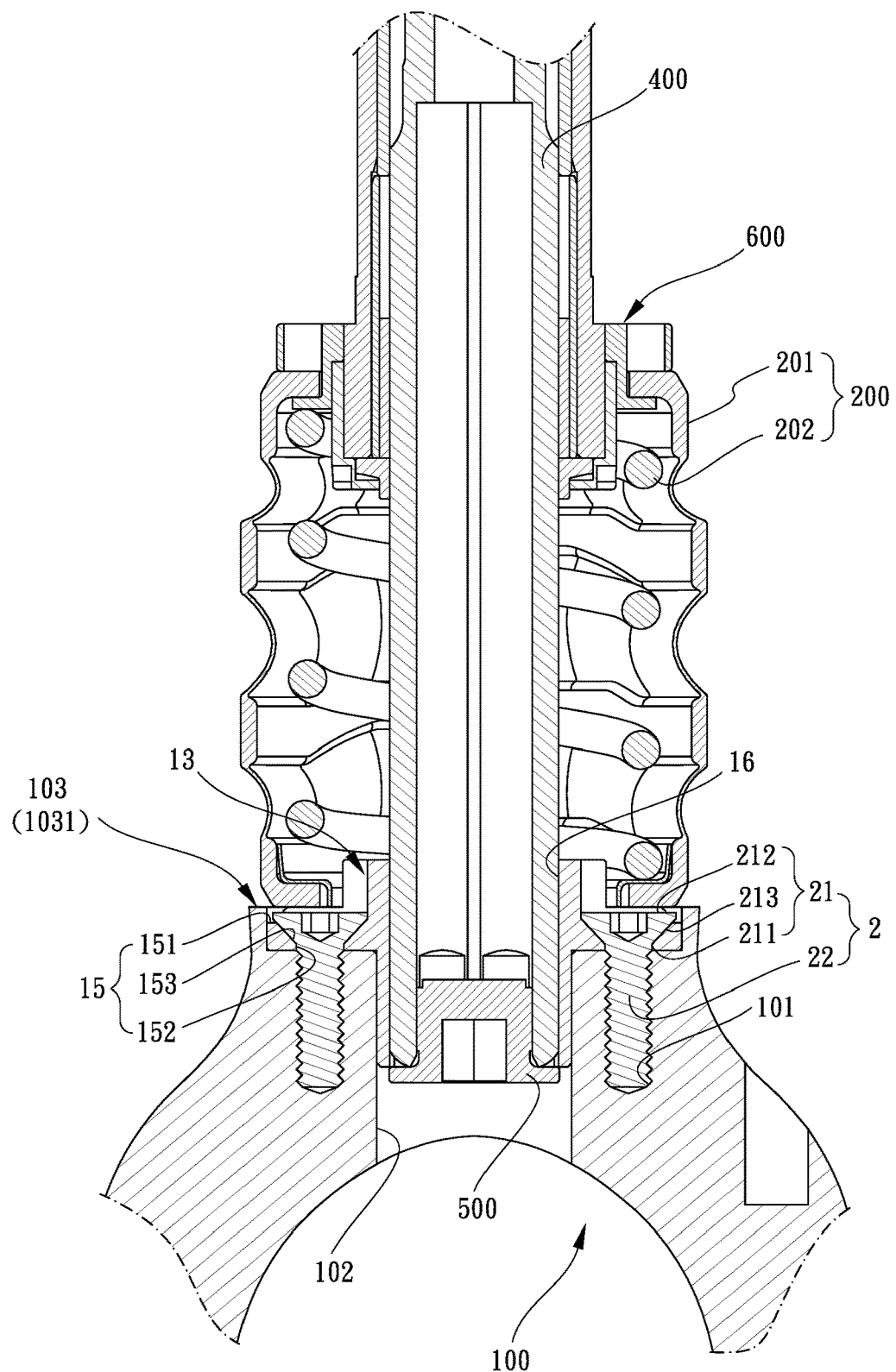
FIG. 6 is a cross sectional view, taken along line VI-VI of FIG. 1.
Figure 7:
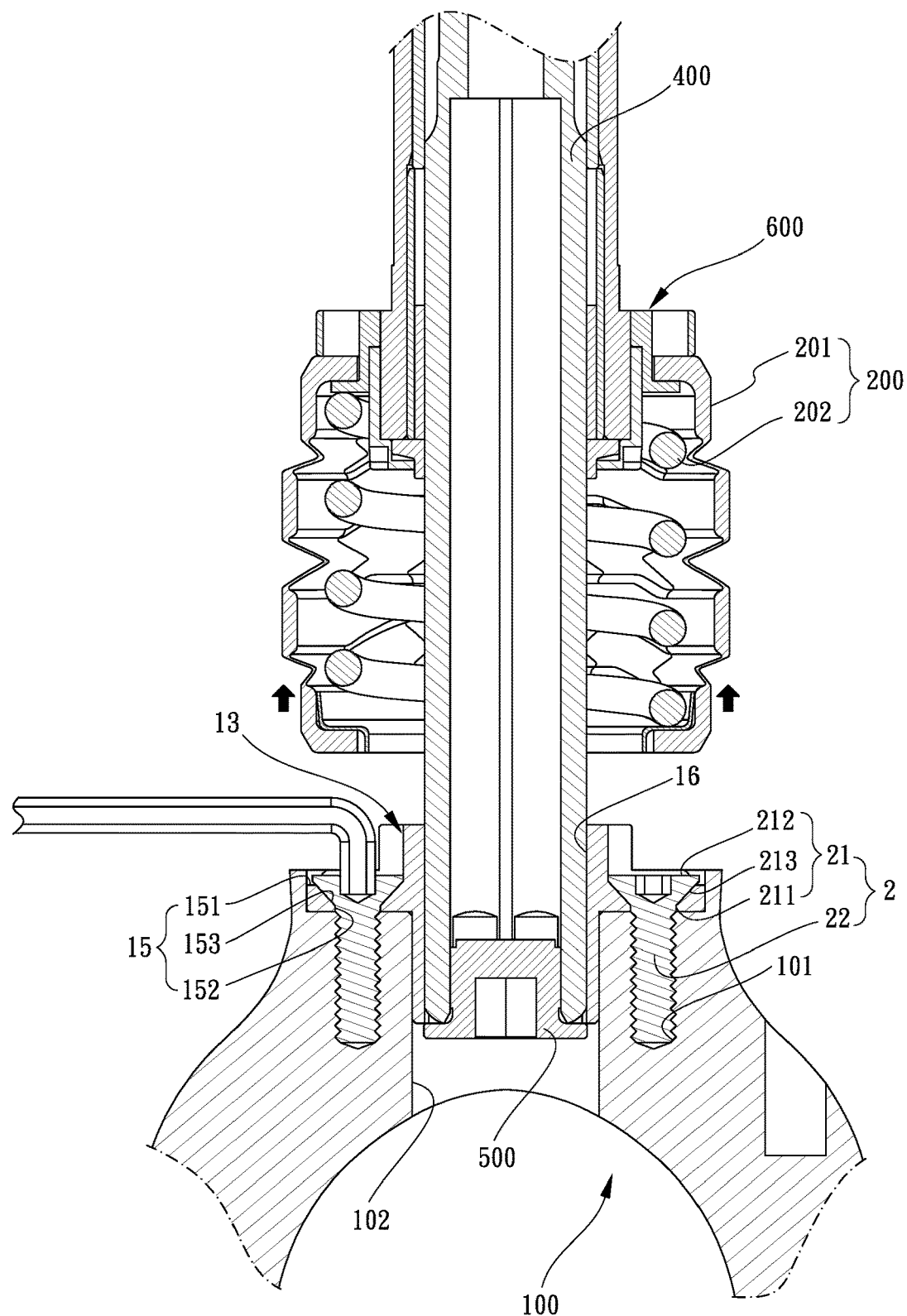
FIG. 7 is a cross sectional view to show that the sleeve is pulled up and a tool rotates a bolt.
Figure 8:
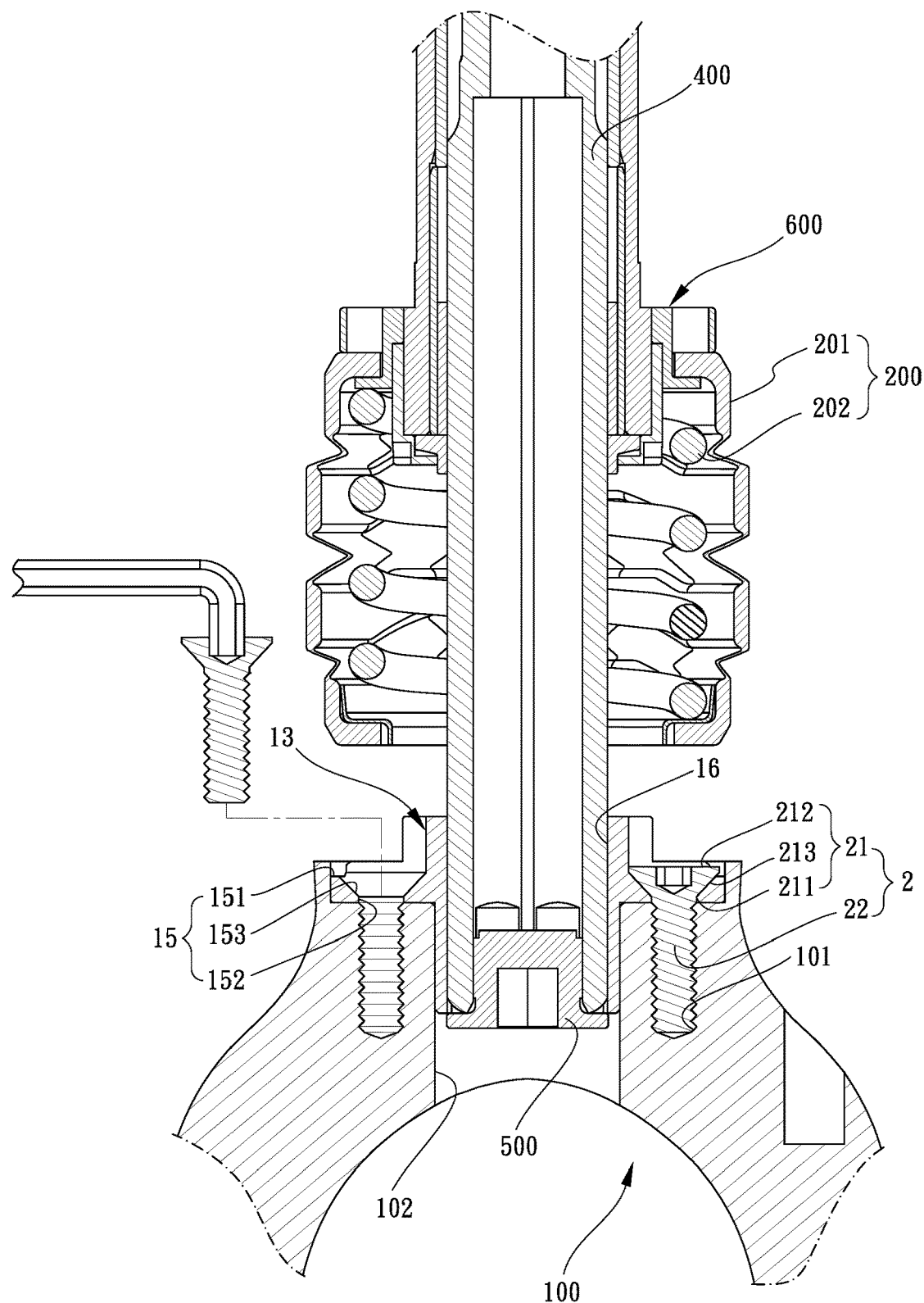
FIG. 8 shows that the bolts are removed one by one to separate the suspension device and the front fork.
Figure 9:
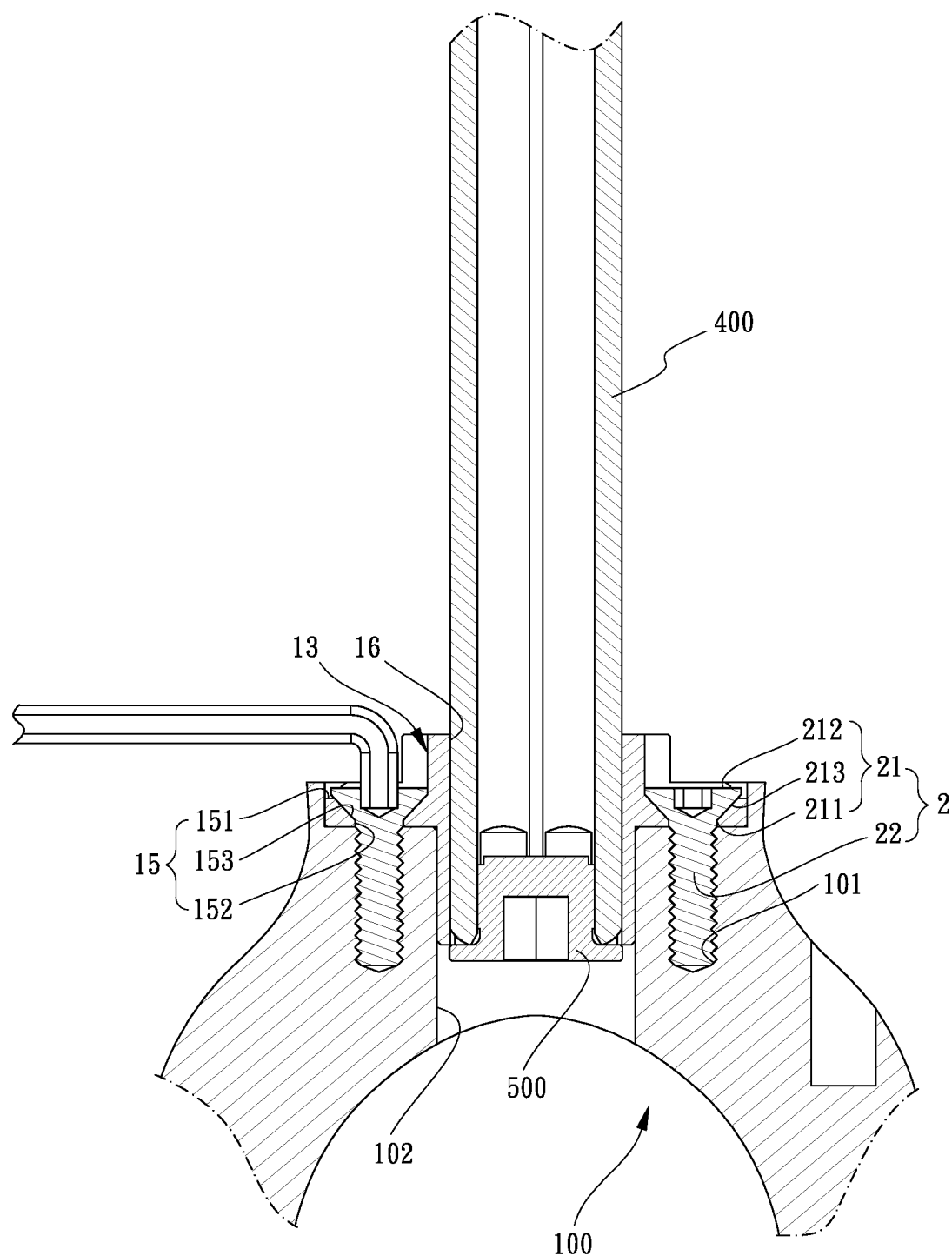
FIG. 9 shows that the suspension device is removed from the front fork.

As shown in FIGS. 5 and 6, each of the bores 15 includes an opening 151, a path 152 and a tapered ramp 153 which is formed between the opening 151 and the path 152. The opening 151 is formed through the top face 11 of the adapter 1, and the path 152 is defined through the bottom face 12 of the adapter 1. The diameter of the opening 151 is greater than that of the path 152. Each of the bolts 2 includes a head 21 and a threaded shank 22 which extends from the head 21. Each head 21 includes a top side 212, a bottom side 211 and a tapered surface 213 which is formed between the top side 212 and the bottom side 211. The threaded shank 22 of each bolt 2 extends through the path 152 of the bore 15 corresponding thereto and is connected to the threaded hole 101 of the front fork 100. The top side 212 of each bolt 2 is in flush with opening 151 of the bore 15, or the top side 212 of each bolt 2 is located above the opening 151 of the bore 15. The tapered surface 213 of each bolt 2 is engaged with the tapered ramp 153 of the bore 15 corresponding thereto. Therefore, the bolts 2 do not drop from the bores 15. The top side 212 of each head 21 is located lower than the top of the extension 132 so that each bolt 2 is protected in the area composed of the protrusion 131, the extension 132 and the bore 15.

Figure 1:
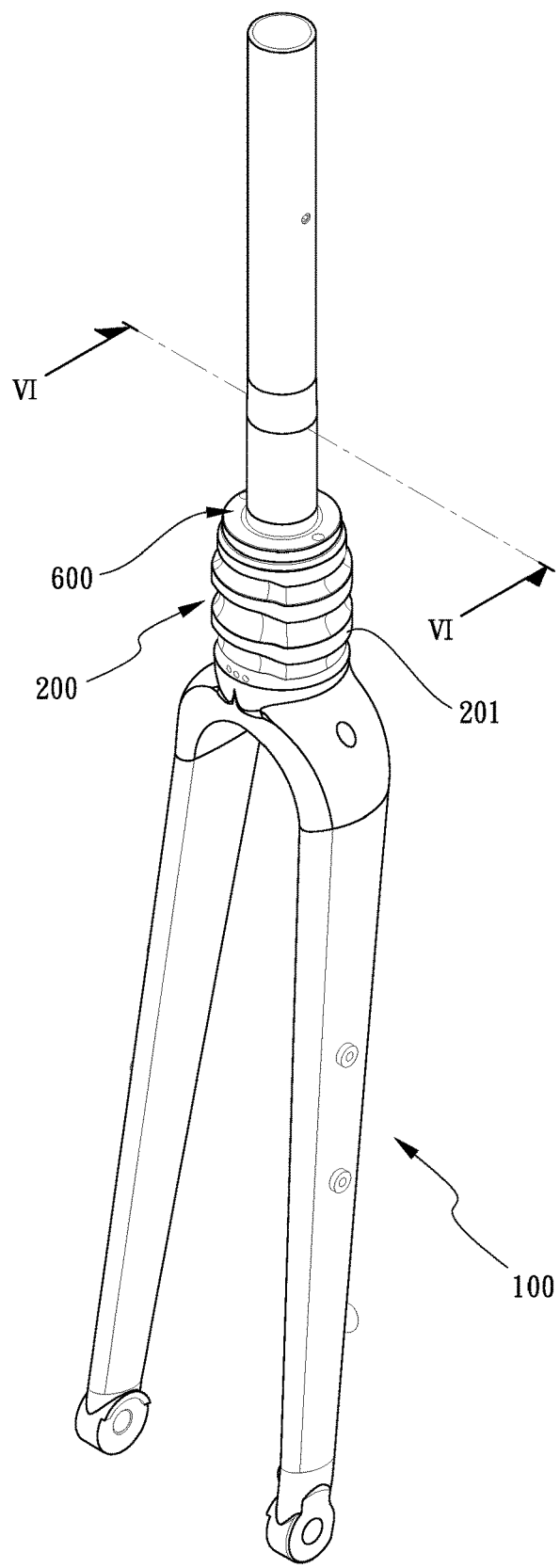
FIG. 1 is a perspective view to show that the locking device of the present invention used to a front fork with a suspension device.
Figure 2:
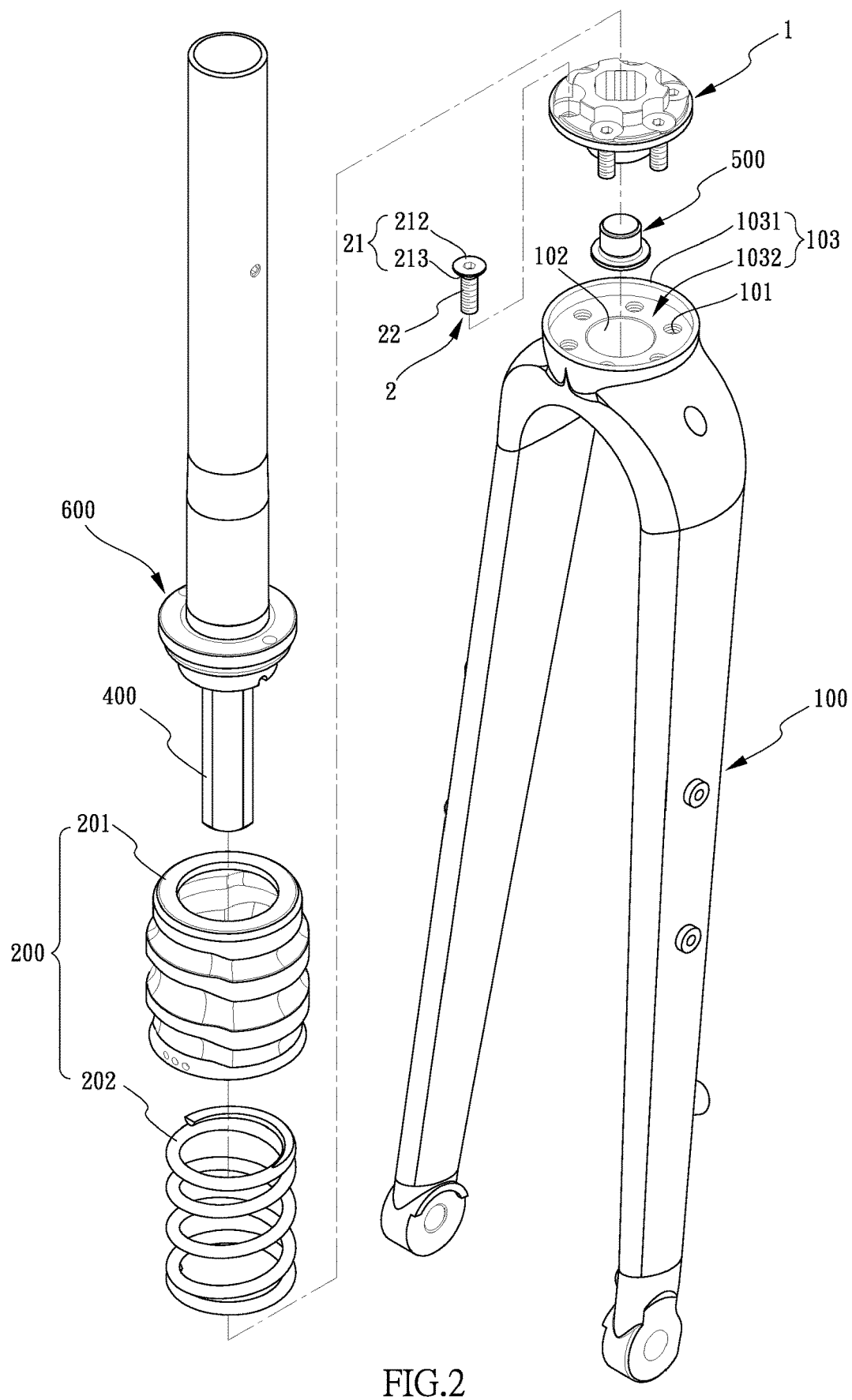
FIG. 2 is an exploded view of the locking device of the present invention and the front fork with the suspension device.

As shown in FIGS. 2 and 6, the front fork 100 includes a through hole 102 defined axially therethrough, and the second part 14 is inserted into the through hole 102. The bottom face 12 of the adapter 1 contacts the top of the front fork 100. A steerer tube 400 extends through the axial hole 16 of the second part 14 from the top of the front fork 100. An end cap 500 is connected to the lower end of the steerer tube 400. A recessed area 103 is formed to the top of the crown of the front fork 100 and includes a flange 1031 that encloses an inner bottom 1032 of the recessed area 103. The adapter 1 is located in the recessed area 103, and the periphery of the adapter 1 contacts the inner periphery of the flange 1031. The threaded holes 101 are defined in the inner bottom 1032 of the recessed area 103. Therefore, the adapter 1 is restricted by the flange 1031 and does shift and move. By the arrangement between the flange 1031 and the adapter 1, the force that applies to the adapter 1 can be spread so that the life of the adapter 1 can be prolonged.

The suspension device 200 includes a sleeve 201 and a spring 202 which is mounted to the steerer tube 400. The sleeve 201 is mounted to the steerer tube 400 and the spring 202. The sleeve 201 is a retractable sleeve 201 and its lower end contacts the top of the extensions 132. An upper end of the sleeve 201 is connected to the headset 600 which is connected to the steerer tube 400. The spring 202 is biased between an inner end of the sleeve 201 and an underside of the headset 600, so that the spring 202 is compressed and bounces back along the direction of the force that applies to the spring 202. The sleeve 201 protects the spring 202 from being affected by any foreign objects as shown in FIG. 6.

While we have shown and described the embodiment in accordance with the present invention, it should be clear to those skilled in the art that further embodiments may be made without departing from the scope of the present invention.

What is claimed is:

1. A bike front fork assembly, comprising:
   a front fork (100) having a crown and threaded holes (101) defined in the crown of the front fork (100);
   an adapter (1) having a top face (11) and a bottom face (12), the top face (11) of the adapter (1) adapted to contact a suspension device (200), a first part (13) extending axially and upward from the top face (11) of the adapter (1), a second part (14) extending axially and downward from the bottom face (12) of the adapter (1), the bottom face (12) of the adapter (1) connected to the front fork (100), multiple bores (15) defined through the top face (11) and the bottom face (12) of the adapter (1), the bores (15) located around the first part (13) and the second part (14), an axial hole (16) defined through the first part (13) and the second part (14) and
   multiple bolts (2) extending through the bores (15) and threadedly connected to the threaded holes (101) defined in the crown of the front fork (100), wherein the first part (13) includes a protrusion (131) which includes multiple radial portions (1311) protruding radially from an outer periphery of the protrusion (131), an extension (132) extends radially from a lower portion of each radial portion (1311), the bores (15) are alternatively located between the extensions (132).

2. The bike front fork assembly as claimed in claim 1, wherein the first part (13) includes multiple curved recesses (133) formed through a top of thereof, each of the curved recesses (133) is located corresponding to and in communication with one of the bores (15), a cut-out (134) is formed along a periphery of each bore (15) and located between two extensions (132), each cut-out (134) is located opposite to the curved recess (133) corresponding thereto.

3. The bike front fork assembly as claimed in claim 1, wherein each of the bores (15) includes an opening (151), a path (152) and a tapered ramp (153) which is formed between the opening (151) and the path (152), the opening (151) is formed through the top face (11) of the adapter (1), the path (152) is defined through the bottom face (12) of the adapter (1), a diameter of the opening (151) is greater than that of the path (152).

4. The bike front fork assembly as claimed in claim 3, wherein each of the bolts (2) includes a head (21) and a threaded shank (22) which extends from the head (21), each head (21) includes a top side (212), a bottom side (211) and a tapered surface (213) which is formed between the top side (212) and the bottom side (211), the threaded shank (22) of each bolt (2) extends through the path (152) of the bore (15) corresponding thereto and is connected to the threaded hole (101) of the front fork (100), the top side (212) of each bolt (2) is in flush with the opening (151) of the bore (15), or the top side (212) of each bolt (2) is located above the opening (151) of the bore (15), the tapered surface (213) of each bolt (2) is engaged with the tapered ramp (153) of the bore (15) corresponding thereto.

5. The bike front fork assembly as claimed in claim 1, wherein the front fork (100) includes a through hole (102) defined axially therethrough, the second part (14) is inserted into the through hole (102), the bottom face (12) of the adapter (1) contacts a top of the front fork (100), a steerer tube (400) extends through the axial hole (16) of the second part (14) from the top of the front fork (100), an end cap (500) is connected to a lower end of the steerer tube (400).

6. The bike front fork assembly as claimed in claim 5, wherein the suspension device includes a sleeve (201) and a spring (202) which is mounted to the steerer tube (400), the sleeve (201) is mounted to the steerer tube (400) and the spring (202), the sleeve (201) is a retractable sleeve (201) and has a lower end thereof contacting the extensions (132).

7. The bike front fork assembly as claimed in claim 6, wherein an upper end of the sleeve (201) is connected to a headset (600) which is connected to the steerer tube (400), the spring (202) is biased between an inner end of the sleeve (201) and an underside of the headset (600).

8. The bike front fork assembly as claimed in claim 1, wherein a recessed area (103) is formed to a top of the crown of the front fork (100) and includes a flange (1031) that encloses an inner bottom (1032) of the recessed area (103), the adapter (1) is located in the recessed area (103), a periphery of the adapter (1) contacts an inner periphery of the flange (1031), the threaded holes (101) are defined in the inner bottom (1032) of the recessed area (103).

* * * * *